United States Patent [19]

Duerksen et al.

[11] Patent Number: 4,576,232

[45] Date of Patent: Mar. 18, 1986

[54] NON-CONDENSIBLE GAS INJECTION INCLUDING ALPHA-OLEFIN SULFONATE DIMER SURFACTANT ADDITIVES AND A PROCESS OF STIMULATING HYDROCARBON RECOVERY FROM A SUBTERRANEAN FORMATION

[75] Inventors: John H. Duerksen, Fullerton; Robert G. Wall, Pinole; Jack D. Knight, Berkeley, all of Calif.

[73] Assignee: Chevron Research Company, San Francisco, Calif.

[21] Appl. No.: 507,835

[22] Filed: Jun. 24, 1983

[51] Int. Cl.$^4$ ............................................. E21B 43/22
[52] U.S. Cl. ..................................... 166/274; 166/273; 166/275; 166/309; 252/8.55 D
[58] Field of Search ................................ 166/272-275, 166/303, 309; 252/8.55 D

[56] References Cited

U.S. PATENT DOCUMENTS

| | | | |
|---|---|---|---|
| 3,185,634 | 5/1965 | Craig, Jr. et al. | 166/273 |
| 3,444,191 | 5/1969 | Nielsen | 260/513 |
| 3,463,231 | 8/1969 | Hutchison et al. | 166/309 X |
| 3,529,668 | 9/1970 | Bernard | 166/273 |
| 3,721,707 | 3/1983 | Straus et al. | 260/513 |
| 3,893,511 | 7/1975 | Root | 166/274 X |
| 3,951,823 | 4/1976 | Straus et al. | 252/8.5 C |
| 3,953,338 | 4/1976 | Straus et al. | 166/309 X |
| 4,085,800 | 4/1978 | Engle | 166/288 |
| 4,393,937 | 7/1983 | Dilgren et al. | 166/272 |
| 4,417,088 | 11/1983 | Miller | 585/533 |

OTHER PUBLICATIONS

Surfactant Enhanced Steam Drives for Heavy Oil Recovery, Dilgren et al., American Oil Chemists Society Annual Meeting, Paper No. 279, May 1982.

"The Mechanism of Gas and Liquid Flow Through Porous Media in the Presence of Foam", by L. W. Holm, Union Oil Company.

"Effect of Foam on Permeability of Porous Media to Gas", by G. G. Bernard et al. Pure Oil Company, *Society of Petroleum Engineers Journal*, Sep. 1961, pp. 267–274.

"Use of Surfactant to Reduce $CO_2$ Mobility in Oil Displacement", by G. G. Bernard et al., Union Oil Company, *Society of Petroleum Engineers Journal*, Aug. 1980, pp. 281–292.

*Primary Examiner*—George A. Suchfield
*Attorney, Agent, or Firm*—D. A. Newell; E. J. Keeling; A. Stephen Zavell

[57] ABSTRACT

An improved non-condensible gas injection process for recovering hydrocarbons from a subterranean formation. The process includes the use of alpha-olefin sulfonate monomer and alpha-olefin sulfonate dimer surfactants along with the gas to form a gas-foam drive medium which is injected into the formation through at least one injection well to enhance the recovery of hydrocarbons from at least one production well.

26 Claims, No Drawings

NON-CONDENSIBLE GAS INJECTION INCLUDING ALPHA-OLEFIN SULFONATE DIMER SURFACTANT ADDITIVES AND A PROCESS OF STIMULATING HYDROCARBON RECOVERY FROM A SUBTERRANEAN FORMATION

BACKGROUND OF THE INVENTION

This invention relates to enhanced oil recovery. More specifically, this invention relates to a process of enhancing oil recovery with a gas foam injection.

Many petroleum formations require assistance to economically produce hydrocarbons therefrom. The hydrocarbons can be recovered through the use of gas drives which are miscible with the in-place oil or generate a miscible drive of the in-place oil. Optionally, the gas drives may lower the viscosity of the hydrocarbons and enhance the flow of the hydrocarbons toward a production well. However, after initial breakthrough of the injected gas at the production well, the injected gas preferentially follows the path of the breakthrough. Thus, the total amount of rhe formation that is swept by the injected gas is limited. Solutions of commercial surfactants, such as Orvus K Liquid, a product of the Procter & Gamble Co., and Alipal CD-128, a product of the GAF Corporation, have been injected along with gas to create a gas foam flood. These materials are modified ammonium alkyl sulfates and ammoniun salts of sulfated linear primary alcohol ethoxylate, respectively. The surfactants and gas form a foam that inhibits the flow the gas into that portion of the formation containing only residual oil saturation. Residual oil saturation is defined as the immobile oil remaining in that portion of the reservoir swept by gas or other enhanced recovery means This forces the gas to drive the recoverable hydrocarbons from the less depleted portions of the reservoir toward the production well(s).

To maximize the extraction of hydrocarbons from a formation, it would be highly desirable to have foaming surfactants which inhibit the flow of gas in a gas zone containing only residual oil saturation. Furthermore, it would be desirable to have the surfactants in a gas foam recovery process which inhibit the flow of the gas in the zone which contains only the residual oil and enhance the flow of gas in the zone which contains the recoverable hydrocarbons. However, it is desirable not to have the flow of the recoverable hydrocarbons inhibited in the gas zone having an oil saturation greater than the residual oil saturation.

SUMMARY OF THE INVENTION

We have invented a surfactant gas foam process for recovering hydrocarbons from a subterranean formation. The gas can be any non-condensible gas such as $CO_2$, $N_2$, CO, flue gas, and the like. The process comprises the injection of a class of dimers of $C_5$–$C_{24}$ alpha-olefin dimers as foaming surfactants into the gas injection at at least one injection well to enhance the recovery of hydrocarbons from at least one production well. The foaming characteristics of the alpha-olefin sulfonate dimers enhance the sweeping of the gas through the formation. This enhances the recovery of hydrocarbons at the production well. The surfactant-gas foam combination also recovers additional hydrocarbons from the previously residual oil saturated portions of the formation swept by only gas. The foamable mixture of gas and surfactant solution is injected into the formation at an injection well and displaced toward the production well with either additional foamable mixture, gas alone, or a water drive to recover the hydrocarbons from the formation.

DETAILED DESCRIPTION OF THE INVENTION

Foaming surfactants for the injection can be evaluated by comparing several properties of the foams. Some of these properties are resistance factors, (R), which are determined by the pressure drop across a foam generator or a sandpack with simultaneous flow of a non-condensible gas, and brine as illustrated and at the following conditions: (1) at residual oil saturation with and without surfactant, and (2) at mobile oil saturation with and without surfactant. The resistance factors are defined in Table I.

TABLE I

| Resistance Factor | Definition | Relation to Reservoir | Desired Value |
|---|---|---|---|
| $R_1$ | $\Delta P$(Surfactant + Brine + NCD + $S_{or}$) | $\Delta P$ in gas zone at $S_{or}$ w/foam | High |
|  | $\Delta P$(Brine + NCD + $S_{or}$) | $\Delta P$ in gas zone at $S_{or}$ wo/foam |  |
| $R_2$ | $\Delta P$(Surfactant + Brine + NCD + $S_{or}$) | $\Delta P$ in gas zone at $S_{or}$ w/foam | High |
|  | $\Delta P$(Surfactant + Brine + NCD + $S_o$) | $\Delta P$ in gas zone at $S_o$ w/foam |  |
| $R_3$ | $\Delta P$(Surfactant + Brine + NCD + $S_o$) | $\Delta P$ in gas zone at $S_o$ w/foam | Low (preferably <1) |
|  | $\Delta P$(Brine + NCD + $S_o$) | $\Delta P$ in gas zone at $S_o$ wo/foam |  |

$\Delta P$ = Pressure drop across foam generator
$S_{or}$ = Residual oil saturation
$S_o$ = Oil saturation ($S_o > S_{or}$)
w = with
wo = without
NCD = Non-condensible Gas A high value of $R_1$ indicates that the surfactant has the capability to create a foam that strongly inhibits the flow of gas in a gas zone containing residual oil. This parameter has been used before to evaluate surfactants and gas floods. Higher $R_1$ values indicate more desirable surfactants. In addition, resistance factors $R_2$ and $R_3$ are also important for evaluating the surfactant effectiveness. A high value of $R_2$ indicates the surfactant makes a much stronger flow inhibiting foam in a gas zone with residual oil than it makes in a gas zone with recoverable hydrocarbons. This has the effect of blocking off that portion of the formation which has been swept of recoverable hydrocarbons and forces the additional gas injection to drive the recoverable hydrocarbons toward the production well. $R_3$ values should approach one and preferably be less than 1. An $R_3$ value less than one indicates that the surfactant itself has the ability to actually improve the flow of recoverable hydrocarbons in the gas zone relative to the absence of surfactant. Thus, high values of $R_1$ and $R_2$ and a value of $R_3$ less than 1.0 would indicate the most desirable surfactants to divert gas from the depleted zone of the reservoir and to accelerate the growth of the gas zone and thereby to accelerate and increase the production of crude oil for a given amount of gas injection.

The surfactants of the invention are the alpha-olefin sulfonate dimers alpha-olefin sulfonates wherein the alpha-olefins have a carbon chain length of from about $C_5$ to about $C_{24}$. In other words, the dimer has a chain length of $C_{10}$-$C_{48}$. The alpha-olefin sulfonate dimers derived from the monomers of $C_{11}$-$C_{18}$ alpha-olefin sulfonates are preferred. These preferred dimers are alpha-olefin sulfonate dimers in the range of $C_{22}$-$C_{36}$. Mixtures of the alpha-olefin sulfonate dimers can be employed to optimize the recovery of hydrocarbons from a particular formation. Furthermore, the alpha-olefin sulfonate dimers can be mixed with monomer alpha-olefin sulfonates to further optimize the recovery from a particular formation. The teachings of our application filed concurrently with this application, U.S Ser. No. 507,834 filed June 24, 1983, now abandoned and entitled "Alpha Olefin Sulfonate Surfactant Additives for Gas Foam Drives and a Process of Stimulating Hydrocarbon Recovery from a Subterranean Formation" are completely incorporated herein by references for all purposes. The alpha-olefin sulfonates are prepared by any known process such as the procedure described in GB No. 2,095,309A, incorporated herein by reference. Suitable examples of dimers of alpha-olefin sulfonates would be the dimers of Thermophoam BW-D ®, a product of the Far Best Company, Stepanflo 30 ®, a product of the Stepan Company, and the Alpha Olefin produce series by Chevron Chemical Company.

The alpha-olefin sulfonate dimers can be prepared by any known process. For example, the alpha-olefin sulfonate dimers of the monomers are complex mixtures of compounds which can be prepared by heating the monomers at a temperature above about 110° C. as disclosed in U.S. Pat. No. 3,721,707, completely incorporated herein by reference. For convenience, the mixture is referred to as alpha olefin sulfonate alpha-olefin sulfonate dimers. Of course, a specific dimer can be prepared by starting with a specific monomer.

The injection and production wells can be arranged in any pattern. For example, a two-spot, a three-spot, a regular four-spot, a skewed four-spot, a five-spot, a seven-spot, an inverted seven-spot, and the like. Suitable patterns are described in The Reservoir Engineering Aspects of Waterflooding by Forrest F. Craig, Jr., Society of Petroleum Engineers of AIME, 1971, page 49, incorporated herein by reference. Preferably, the injection well is surrounded by production wells, i.e., inverted five-spot and seven-spot patterns.

Any standard method of creating a gas surfactant foam is suitable for use in the invention. Preferably, the non-condensible gas is nitrogen or carbon dioxide. A preferred process of creating the foam and sweeping the formation is disclosed in U.S. Application entitled "Steam, Non-Condensible Gas and Foam for Steam and Distillation Drives in Subsurface Petroleum Formation" by John H. Duerksen, filed Mar. 18, 1983, and assigned U.S. Ser. No. 476,642 now U.S. Pat. No. 4,488,598. The process disclosed therein is completely incorporated herein by reference. However, the surfactant water combination must not be heated to a temperature at which steam forms. Alternatively, the procedures outlined in U.S. Pat. No. 4,086,964 completely incorporated herein by reference can be employed. In addition, the procedures outlined in U.S.Pat. Nos. 4,085,800 and 3,412,793, completely incorporated herein by reference, can be used with producing formations that contain zones of high permeability and/or are susceptible to channeling. In those formations, the high permeability zones are plugged to enhance the recovery of hydrocarbons from the zones of lower permeability. Again, these processes must be carried out at a temperature below the steam formation temperature of the reservoir.

The foam is created by mixing water or other suitable liquid containing the surfactant and injecting the non-condensible gas therein at a rate of about 5,000,000 standard cubic feet per day, ($5\overline{M}$ SCF/D). The surfactant is from about 0.01% to about 10% of the liquid phase of the gas-foam combination. Preferably, the surfactant is employed in as small an amount as possible to enhance the oil recovery. This is on the order of about 0.1% to about 1% surfactant present in the liquid phase. The non-condensible gas-foam combination is from about 1 to about 99% non-condensible gas and from about 99 to about 1% surfactant phase by volume. The gas-foam is injected into an injection well at a rate determined by reservoir characteristics and well pattern area. Typically, gas and surfactant solution are injected into each injection well at $5\overline{M}$ SCF/D and 2,500 barrels per day (BPD), respectively. Optionally, the water or other suitable liquid for forming the foam can contain other additives which enhance its properties such as scale inhibitors, cosurfactants, and the like. The water can also contain salts.

The process is carried out in the following procedure to minimize the cost of the operation. Initially, a first slug of gas is injected into the formation for a sufficient time to form a gas zone in the subterranean formation containing the hydrocarbons. The gas injection is continued until there is gas breakthrough at the production well. This recovers the mobile oil in the gas-swept portion of the formation. Thereafter, a second slug of gas and foam surfactant is injected. This slug diverts the gas from the area of breakthrough and forces it to sweep through undepleted portions of the formation to recover additional hydrocarbons. Slugs of gas and surfactant can be alternated with slugs of pure gas. Optionally, the slugs can be tapered compositionally from one slug into the next to form a smooth transition or surfactant-gas injection can be continuous. Finally, pure gas is injected to sweep the last portion of the formation.

Modifications to the above alpha olefin sulfonate dimers and process of recovery which would be obvious to the ordinary skilled artisan are contemplated to be within the scope of the invention.

What is claimed is:

1. A non-condensible gas process of recovering hydrocarbons from a subterranean formation in the absence of steam, wherein said formation is penetrated by at least one injection well and at least one production well, said process comprising:
   (a) injecting a non-condensible gas and, including therewith and in the absence of steam, a sufficient amount of an alpha-olefin sulfonate dimer to form a non-condensible gas and alpha-olefin sulfonate dimer foam at an injection well;

(b) continuing to inject said non-condensible gas and alpha-olefin sulfonate dimer foam to assist the movement of hydrocarbons toward said production well, and (c) recovering hydrocarbons from a production well.

2. The process according to claim 1 wherein the alpha-olefin sulfonate dimer comprises from about 0.01% to about 10% of the liquid phase of the foam.

3. The process according to claim 2 wherein a non-condensible gas is from about 1% to about 99% of the foam.

4. The process according to claim 3 wherein the non-condensible gas is selected from the group consisting of nitrogen, carbon dioxide, $CH_4$, air, carbon monoxide and flue gas.

5. The process according to claim 4 wherein the alpha-olefin sulfonate dimer is prepared by the oligomerization process of heating in the liquid phase the sulfonation product of the reaction of sulfur trioxide with a straight-chain alkene hydrocarbon having a carbon content in the range of from about 5 to 24, wherein the heating is at a temperature above about 110° C. and below the carbonization temperature of the sulfonate, is effected in substantial absence of water, and is continued for a period at least sufficient for a significant conversion of the sulfonate feed to the corresponding oligomeric disulfonic acid.

6. The process according to claim 5 wherein said straight chain alkene hydrocarbon is a mixture in the range of $C_5$–$C_{24}$.

7. The process according to claim 6 wherein said straight chain alkene hydrocarbon mixture is in the range of $C_{11}$–$C_{18}$.

8. The process according to claim 6 wherein the alpha-olefin sulfonate dimer includes a mixture of alpha-olefin sulfonate dimer in the range of $C_{10}$–$C_{48}$.

9. The process according to claim 4 wherein the alpha-olefin sulfonate dimer includes alpha-olefin sulfonate dimer in the range of $C_{10}$–$C_{48}$.

10. The process according to claim 2 which further comprises injecting non-condensible gas into the formation prior to the injection of the foam.

11. The process according to claim 10 which further comprises injecting non-condensible gas into the formation after the injection of the foam.

12. The process according to claim 11 wherein the non-condensible injection is tapered into a non-condensible gas and alpha-olefin sulfonate dimer foam injection which is tapered into a non-condensible gas injection.

13. The process according to claim 12 wherein the alpha-olefin sulfonate dimer surfactants are injected in their salt form or the acid form.

14. The process according to claim 13 wherein a non-condensible gas is from about 1% to about 99% of the foam.

15. The process according to claim 14 wherein the alpha olefin sulfonate dimer further includes alpha-olefin sulfonate surfactants having carbon chain lengths in the range of about $C_5$ to $C_{24}$.

16. The process according to claim 15 wherein the alpha-olefin sulfonate dimer is synthesized according to the oligomerization process which comprises heating in the liquid phase of the sulfonation product of the reaction of sulfur trioxide with a straight-chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid and wherein the resulting oligomeric sulfonic acid is neutralized with ammonia, an alkali metal base, a calcium base, a magnesium base, or a mixture thereof.

17. The process according to claim 16 wherein said straight chain alkene hydrocarbon is a mixture in the range of $C_5$–$C_{24}$.

18. The process according to claim 17 wherein said straight chain alkene hydrocarbon mixture is in the range of $C_{11}$–$C_{18}$.

19. The process according to claim 13 wherein said alpha-olefin sulfonate dimer includes alpha-olefin sulfonate dimer in the range of $C_{22}$–$C_{36}$.

20. A non-condensible gas injection process of recovering hydrocarbons from a subterranean formation wherein the formation is penetrated by at least one injection well and at least one production well, said process sequentially comprising:

(a) injecting a non-condensible gas selected from the group consisting of nitrogen, carbon dioxide, air, methane, and mixtures thereof, at an injection well until non-condensible gas breakthrough occurs at a production well;

(b) continuing to inject into said formation said non-condensible gas and, including therewith, a sufficient amount of an alpha-olefin sulfonate dimer to form a non-condensible gas alpha-olefin sulfonate dimer foam to assist the movement of hydrocarbons toward said production well; and (c) recovering hydrocarbons from said production well.

21. The process according to claim 20 wherein the alpha-olefin sulfonate dimer is fabricated according to the oligomerization process which comprises heating in the liquid phase of the sulfonation product of the reaction of sulfur trioxide with a straight-chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid.

22. The process according to claim 21 wherein said straight chain alkene hydrocarbon is a mixture of $C_5$–$C_{24}$ hydrocarbons.

23. The process according to claim 22 wherein said straight chain alkene hydrocarbon mixture is in the range of $C_{11}$–$C_{18}$.

24. The process according to claim 20 wherein said alpha-olefin sulfonate dimer includes alpha-olefin sulfonate dimer in the range of $C_{10}$–$C_{48}$.

25. The process according to claim 24 wherein said alpha-olefin sulfonate dimer includes alpha-olefin sulfonate dimer in the range of $C_{22}$–$C_{36}$.

26. The process according to claim 20 wherein the alpha-olefin sulfonate dimer includes a mixture of alpha-olefin sulfonate dimer in the range of $C_{22}$–$C_{36}$.

* * * * *